(12) United States Patent
Berstis (10) Patent No.: US 6,784,856 B2
(45) Date of Patent: Aug. 31, 2004

(54) SYSTEM AND METHOD FOR ANTI-MOIRE DISPLAY

(75) Inventor: Viktors Berstis, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 337 days.

(21) Appl. No.: 10/015,856

(22) Filed: Dec. 13, 2001

(65) Prior Publication Data

US 2003/0132895 A1 Jul. 17, 2003

(51) Int. Cl.⁷ .................................................. G09G 3/00
(52) U.S. Cl. ............................ 345/55; 345/82; 345/87; 345/92; 313/408
(58) Field of Search ............................. 345/55, 87, 92, 345/61–82; 313/402–409

(56) References Cited

U.S. PATENT DOCUMENTS

| | | | | |
|---|---|---|---|---|
| 3,705,322 A | * | 12/1972 | Naruse et al. | 313/408 |
| 3,925,700 A | * | 12/1975 | Saito | 313/403 |
| 4,665,339 A | * | 5/1987 | Masterton et al. | 313/403 |
| 5,185,817 A | * | 2/1993 | Degi et al. | 382/300 |
| 5,317,405 A | * | 5/1994 | Kuriki et al. | 348/14.16 |
| 5,534,746 A | * | 7/1996 | Marks et al. | 313/408 |
| 5,548,305 A | | 8/1996 | Rupel | 345/597 |
| 5,553,167 A | * | 9/1996 | Dowling | 382/270 |
| 5,648,649 A | | 7/1997 | Bridgelall et al. | 235/462.36 |
| 5,672,934 A | * | 9/1997 | Ohama et al. | 313/402 |
| 5,946,452 A | | 8/1999 | Spaulding et al. | 358/1.9 |
| 5,987,219 A | | 11/1999 | Naylor, Jr. et al. | 358/1.9 |
| 6,152,372 A | | 11/2000 | Colley et al. | 235/472.01 |
| 6,243,070 B1 | | 6/2001 | Hill et al. | 345/589 |
| 6,271,936 B1 | | 8/2001 | Yu et al. | 358/1.9 |
| 6,285,799 B1 | | 9/2001 | Dance et al. | 372/261 |

OTHER PUBLICATIONS

"Minimize Moire' Pattern (scanning)", published by Digital Design and Imaging, downloaded from http://www.godigital-design.com/tips_moire.htm on Nov. 12, 2001.

* cited by examiner

Primary Examiner—Lun-Yi Lao
(74) Attorney, Agent, or Firm—Robert H. Frantz; David A. Mims, Jr.

(57) ABSTRACT

A display with inherent means for avoiding moiré patterns in displayed digitized images having a two-dimensional array of non-uniformly spaced display elements such as LEDs, LCD, or TFT. Pixels within the display are non-uniformly spaced such that a fundamental pattern or "frequency" is not established, thereby avoiding the possibility of display physical characteristics interfering with image features, avoiding apparent moiré patterns and other display artifacts. If the source data for the image is a standard data set which represents data samples at uniformly-spaced pixels, the method interpolates the pixel values for the non-uniformly spaced display elements of the new array.

12 Claims, 8 Drawing Sheets

*Prior Art*

Figure 1

*Prior Art*

Figure 2a

*Prior Art*

SYSTEM AND METHOD FOR ANTI-MOIRE DISPLAY

CROSS-REFERENCE TO RELATED APPLICATIONS

This invention is related to U.S. patent applications 10/015,880 and 10/015,492, respectively, both filed on Dec. 13, 2001 by Viktors Burstis, all of which are commonly assigned.

The related applications, U.S. patent application Nos. 10/015,880 and 10/015,492, respectively, both filed on Dec. 13, 2001 are hereby incorporated by reference in their entireties, including figures.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

This invention relates to the arts of imaging, image processing, and digital displays including display design and moiré reduction technologies.

2. Background of the Invention

Figure 2A:
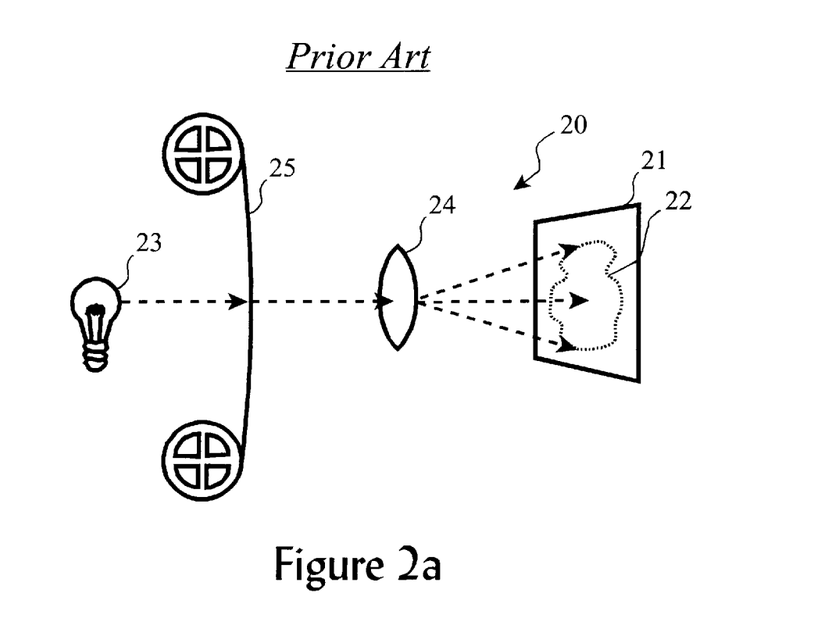
FIG. 2a shows the general arrangement of a film projector.

Well-known imaging technologies include film (e.g. analog), digital, and analog-digital hybrid approaches. Film imaging processes use a set of lenses to focus an image onto a film sheet which is impregnated with grains of material reactive to the spectrum to be recorded, such as visible light, infrared ("IR"), or X-ray. The grains are randomly arranged in each sheet of film, and thus reproduction of the image on the developed film has a certain resolution based on the size and density of these grains. To display this image, the general arrangement of FIG. 2a is employed by film projectors. If the image is a moving image, such as a feature length movie, a film (25) consisting of a plurality of individual "frames" or images is passed between a light source (23) and a focussing lens (24). The incident image (22) on a screen is then perceptible by an observer. For still film image reproduction, such as slides, the film (25) of this arrangement is a single frame. This arrangement can be viewed as a purely analog image reproduction process.

Figure 1:
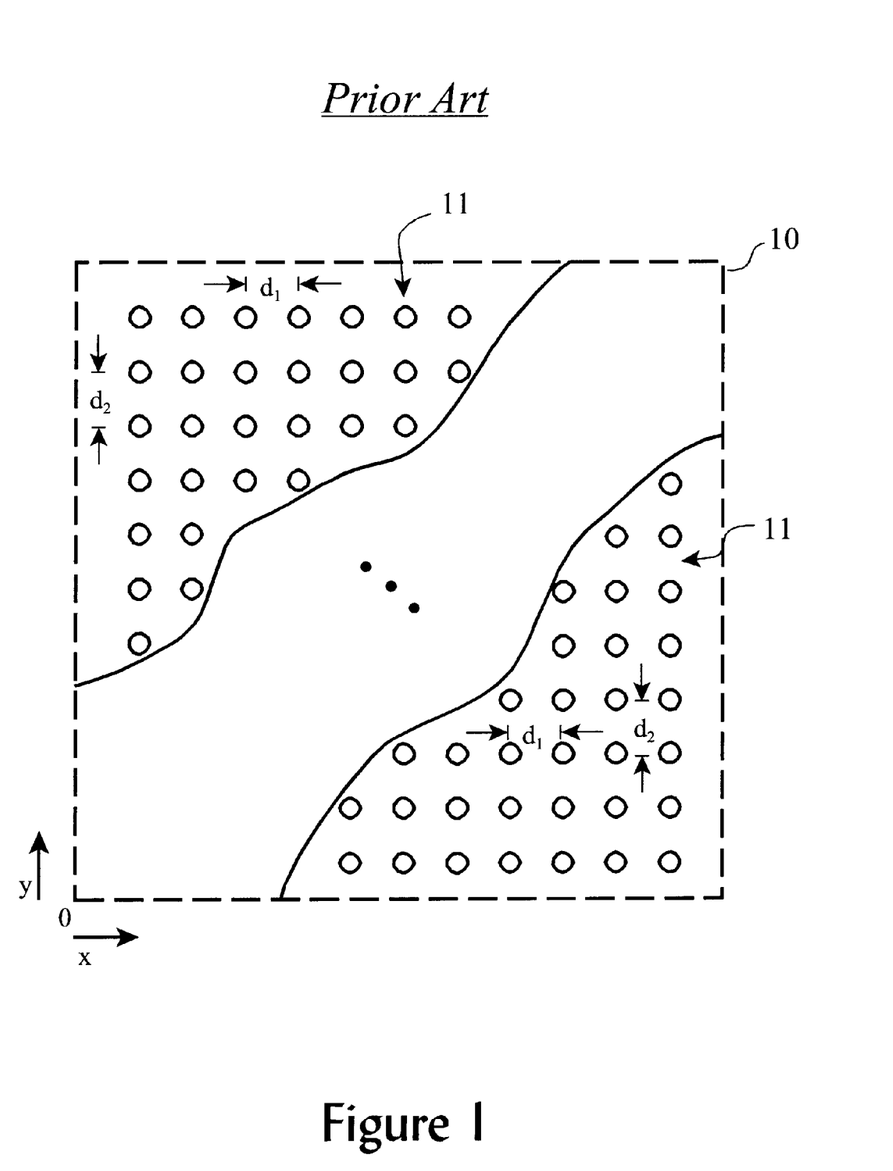
FIG. 1 illustrates the arrangement of display elements in a typical digital display such as an LCD or TFT display.

In digital imaging, a sensor of uniformly-arranged sensing elements is used to capture "bits" or pixels of the image. The pixelated image data set is then stored in a digital file. To reproduce the image and display it to an observer, typically a two-dimensional array of uniformly-spaced display elements (10), as shown in FIG. 1, is modulated according to the data set. In this example, the display elements (11) may be light-emitting diodes (LED) or thin film transistor (TFT) as commonly used in flat panel displays and laptop computer displays, or the more recently developed organic thin-film transistor technology. The status (on/off) and apparent brightness of each display element can be controlled by a display controller, either through analog brightness control (voltage or current setting), or through pulse modulation of the display elements.

The two-dimensional array usually has a uniform spacing $d_1$ between elements (11) in the x-axis, or horizontal direction, and a uniform spacing $d_2$ between the elements in the y-axis, or vertical direction. For many displays, these two spacings are equal (e.g. $d_1=d_2$).

Figure 2B:
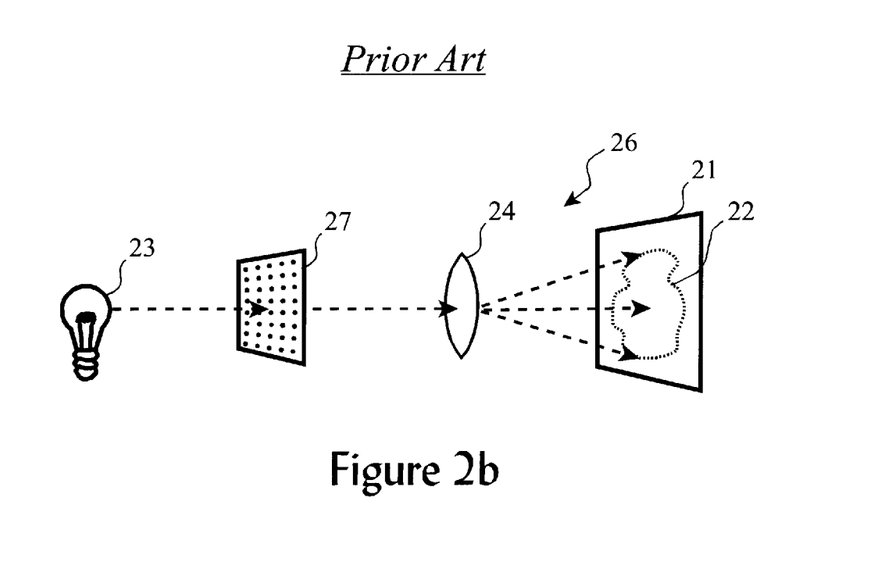
FIG. 2b provides a view of the general arrangement of a computer projector.

To project a digital image, many computer projectors use a transparent liquid crystal display (LCD) (27) in place of the typical analog film situated between a light source (23) and a focussing lens (24), as illustrated in FIG. 2b. This essentially a digital adaptation of the old analog film projector. A controller then drives the transparent LCD (27) controls in order to recreate the digital image on the screen (21).

Figure 3A:
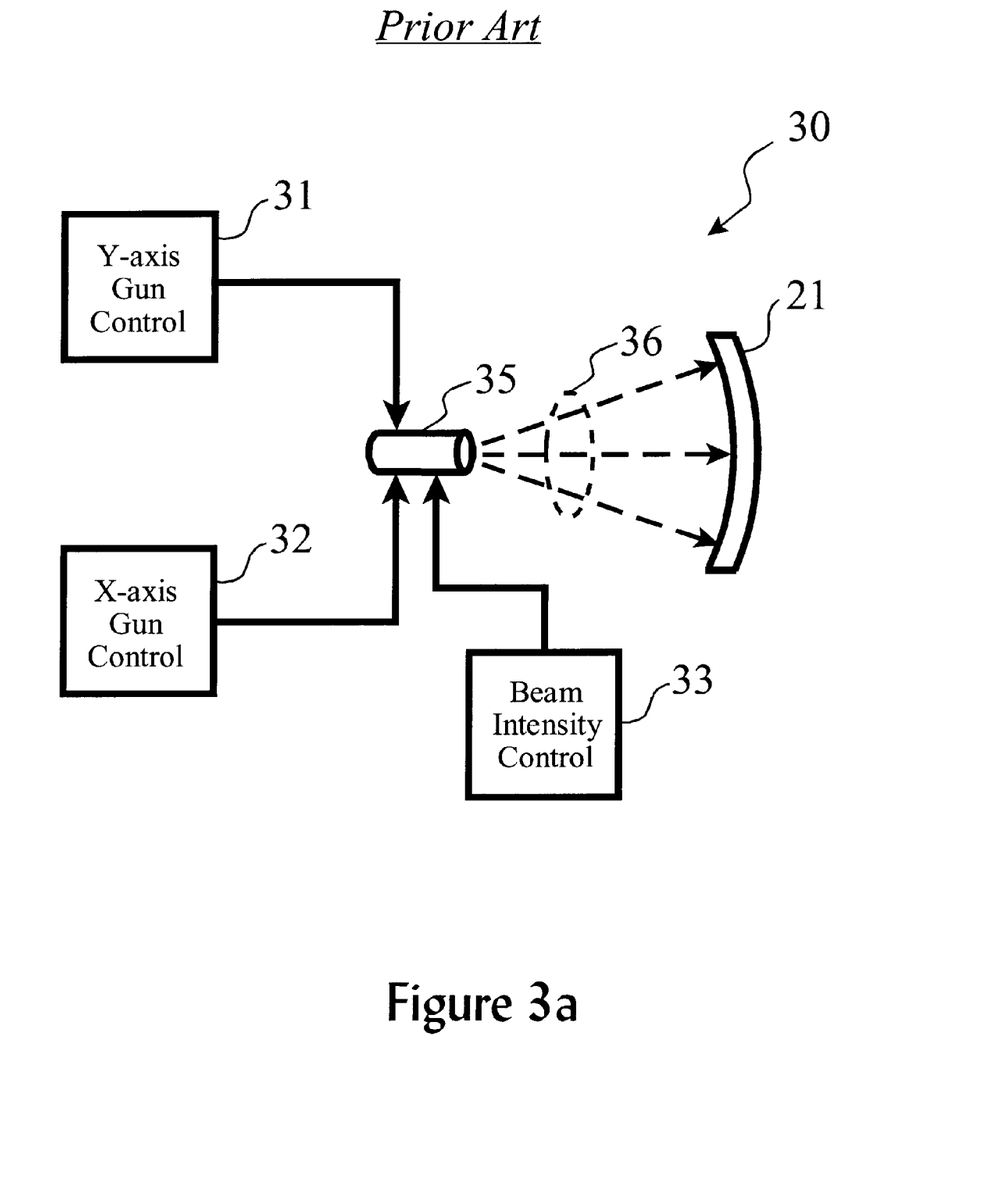
FIGS. 3a and 3b provide illustration how CRT's reproduce images.

A hybrid arrangement (e.g. partially analog, partially digital) which is common place is the cathode ray tube (CRT), in which horizontal "lines" of image are driven by analog signals, but also in which the image is broken vertically into discrete lines. FIG. 3a shows the general arrangement of well-known CRT displays, in which one or more electron guns (35) are controlled so that the resulting incident pattern on a phosphorous-treated screen (21) reproduces an image. Typically, the picture is "painted" by repetitiously scanning the electron beam (36) across the screen (21) in a side-to-side (horizontal) manner, incrementing to an adjacent row or line up or down with each scan from top to bottom.

Figure 3B:
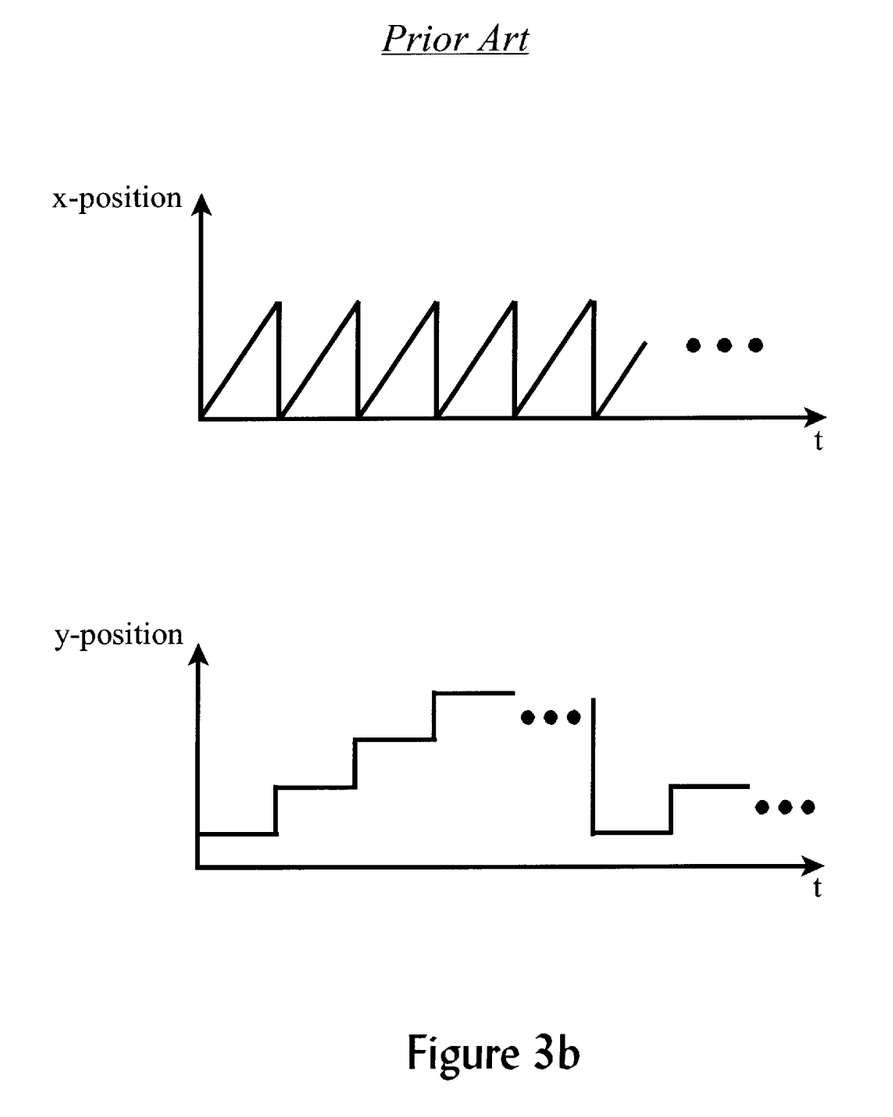

So, over time, the x-axis or horizontal position of the electron beam incident on the screen is driven by a sawtooth or ramp function as shown in FIG. 3b, wherein each "ramp" represents a single line sweep from left to right, for example. The vertical or y-axis position of the electron beam, though, is modulated in discrete steps, such as from top-to-bottom or from bottom-to-top. As each line of the display is swept by the electron beam, the intensity or strength of the beam is modulated causing an apparent increase or decrease in the apparent brightness on the screen. One can view this type of display as being analog in the x-axis (e.g. across each line), but digital in the y-axis (e.g. vertically from line to line).

Moiré patterns are artifacts of certain imaging processes which are perceptible to the human eye, but do not represent actual features or details in the original item imaged. They often resemble crosshatch halftones across all or a portion of a displayed digital image.

For example, when displaying an image having a feature or line at an angle slightly off perfect horizontal or vertical, such as at a 3° or 87° angle on a digital screen, on a TFT laptop computer display which has equal horizontal and vertical pixel-to-pixel spacing, a moiré pattern may be apparent. This occurs because the pixel spacing of the display elements closely matches with image feature. If one considers the display element spacing as one "signal" or function, and the feature within the image as another signal or function, the moiré pattern can be seen as interference pattern between the two signals. As such, changing the display in harmonic manners, such as doubling the density of the display elements, does not reduce the appearance of moiré patterns. This is a well-known phenomena, and is experienced by viewers of all sorts of digital displays often. Even with partially digital displays, such as CRTs, features such as horizontal lines on sports fields may cause noticeable interference with the horizontal lines of the display.

The related patent applications disclosed methods and systems for avoiding the encoding of moiré patterns when digitally recording an image using non-uniformly spaced sensor elements. This allowed images which have features that would normally interfere or resonate with the sensor pattern of typical uniformly-spaced sensor arrays to be captured without the creation of moiré patterns in the data.

However, many images are only available in standard formats, such as bit maps (BMP), Joint Photographic Experts Group (JPEG), or Moving Pictures Experts Group (MPEG) formats, which are based upon uniformly spaced "samples" of the original image. As the inventions of the related applications only reduced moire pattern effects in newly captured images, they are of little use in displaying digital images which were captured using traditional sensor arrays.

Therefore, there is a need in the art for a system and method of digital image display which avoids the appearance of moiré patterns. Further, there is a need in the art for this new system and method to be compatible with common digital image formats such as BMP, JPEG and MPEG.

BRIEF DESCRIPTION OF THE DRAWINGS

The following detailed description when taken in conjunction with the figures presented herein provide a complete disclosure of the invention.

SUMMARY OF THE INVENTION

The present invention provides a means for avoiding moiré patterns in displayed digitized images by employing a two-dimensional display element array of non-uniformly spaced display elements such as LEDs, LCD, or TFT. The invention may also be applied to the line-to-line position controls of a CRT to improve the quality of the displayed image, as well. Points within the display are non-uniformly spaced such that a fundamental pattern or "frequency" is not established, thereby avoiding the possibility of display physical characteristics interfering with characteristics within the image which yields apparent moiré patterns and other display artifacts. If the source data for the image is a standard data set which represents data samples at uniformly-spaced pixels, the method interpolates the pixel values for the non-uniformly spaced display elements of the new array. If the source data for the image is a data set according to the related patent applications (e.g. from a non-uniformly spaced sensor array), conversion to the array spacing functions is performed if necessary. The resulting display, in any case, is a display with non-uniformly spaced pixels or elements which retains the acuity or precision of the display but avoids generation of patterns which are perceptible to the observer.

DETAILED DESCRIPTION OF THE INVENTION

The present invention is realized first by fabricating a two-dimensional array of display elements wherein the rows and columns of the array have non-uniform spacing according to one or more predetermined functions. The display elements may be any useful type of display element appropriate for the desired application, such as visible light emitters and reflectors (bulbs, LEDs, TFTs, LCD). In some applications, electromagnetic emitters operable in other parts of the spectrum, such as Infrared (IR), X-ray, etc., may be employed. Further, the method of the invention may be applied to the line or row-position control on a CRT to reduce the appearance of discrete lines in the display.

Figure 4:
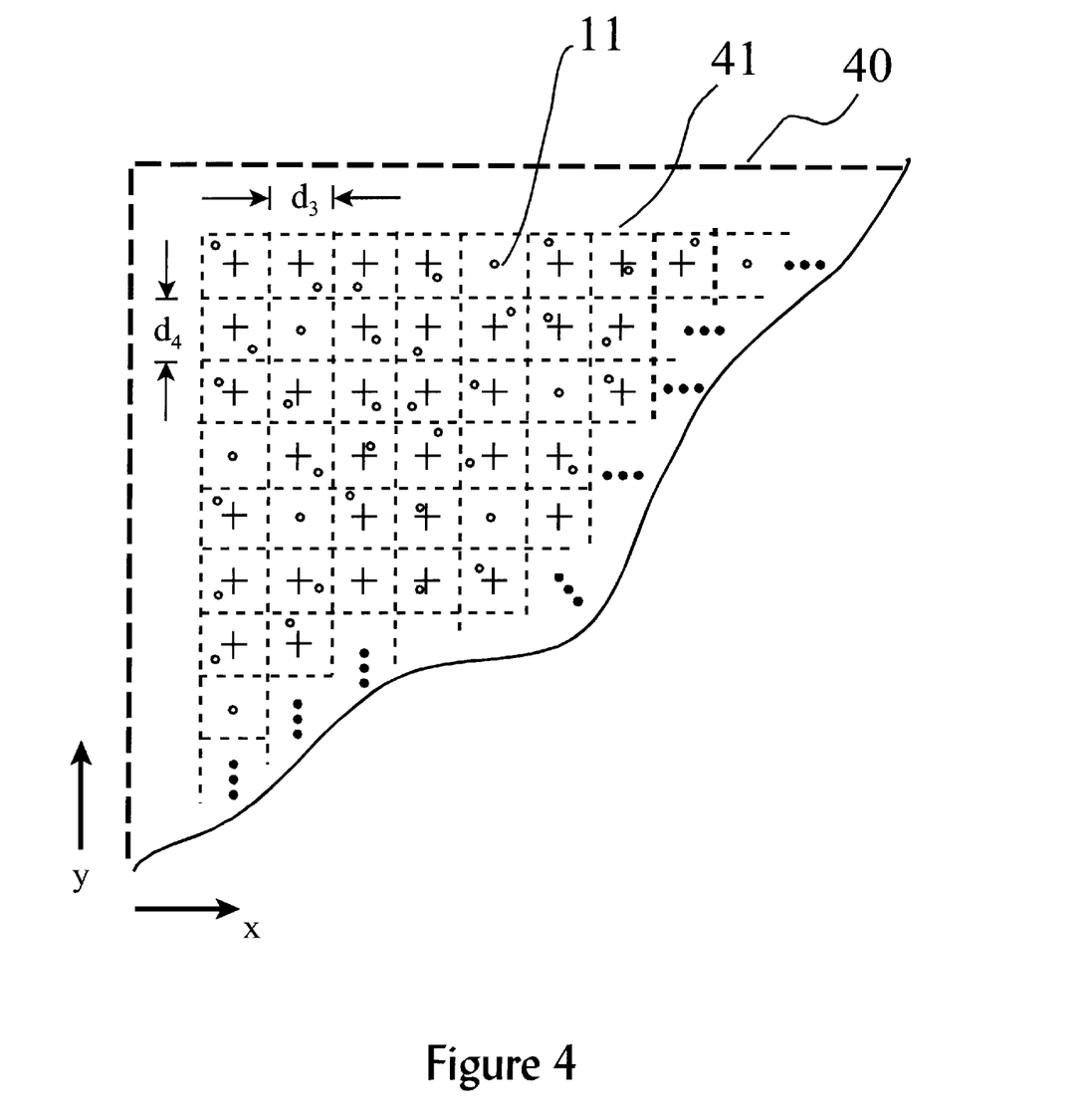
FIG. 4 shows the two-dimensional display element array according to the invention.

Turning to FIG. 4, the two-dimensional array (40) of display elements (11) of the preferred embodiment is shown. A grid (41) has been overlaid on this view to more clearly illustrated the non-uniform nature of the pixel-to-pixel spacing in both axes. While the grid (41) may have uniform x-axis and y-axis arrangement ($d_3$ and $d_4$), the actual spaces between the sensors is non-uniform, as is shown in more detail in FIG. 5.

Figure 5:
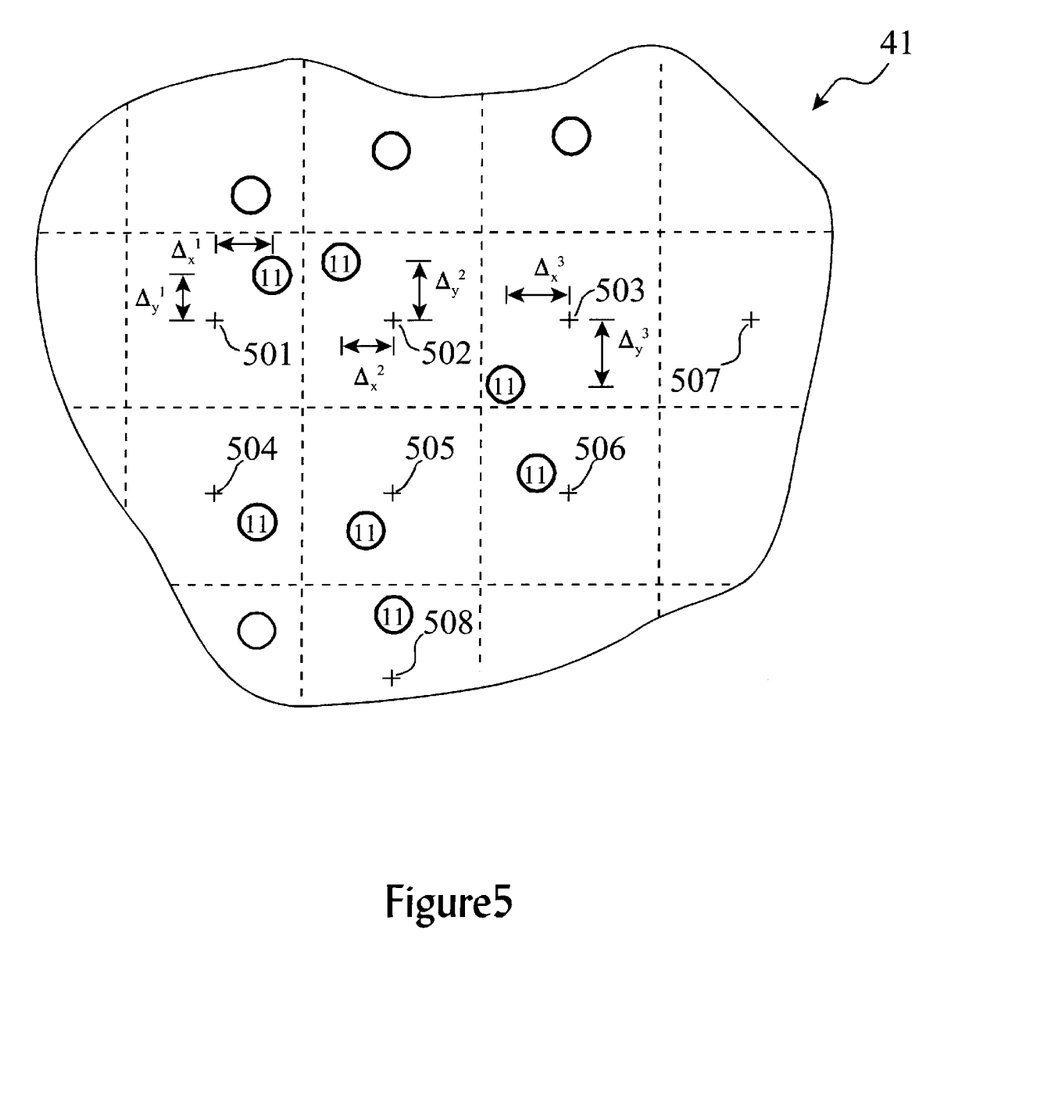
FIG. 5 illustrates the display element placement for a two-dimensional display array according to the invention.

In FIG. 5, a number of uniformly spaced datum points (501, 502, 503, . . . ) are shown, each with an associated display element (11). Each display element is offset in two axes from the datum point. For example, a first pixel (11) is offset in the x-axis from a first datum point (501) by $\Delta_x^1$ (delta-x-one), and in the y-axis by $\Delta_y^1$ (delta-y-one). Similarly, a second pixel may be offset from a second datum point (502) by $\Delta_x^2$ and $\Delta_y^2$, a third pixel from a third datum point (503) by $\Delta_x^3$ and $\Delta_y^3$, and so forth.

If these offset values were all equal or even multiples of a common denominator, moiré effects may be apparent for features in the image which "resonate", interfere with or match the common denominator or standard spacing. However, the spacing between adjacent sensors in the x and y axes are non-uniform, which avoids the physical creation of a "frequency" in the sampling operation.

These non-uniform offset values are preferrably generated by well-defined functions $F_x(n)$ and $F_y(n)$ such as a short pseudo-random patterns or sequences, nonlinear mathematical functions which have broad spectral or harmonic content (e.g. ramp, square or sawtooth functions), or a predictable process such as a cyclic redundancy check ("CRC") polynomial. The function used to determine the sensor-to-sensor spacing of the sensors within a row (e.g. the column-to-column spacing in the x-axis) of the two-dimensional array can be generally expressed as:

Position of sensor at column $c = c \cdot P_{col\_std} + F_x(n)$ as well as the sensor-to-sensor spacing within a column (e.g. the row-to-row spacing in the y-axis):

Position of sensor at row $r = r \cdot P_{row\_std} + F_y(n)$ where $P_{col\_std}$ is the standard or uniform spacing between columns of sensors, $P_{row\_std}$ is the standard or uniform spacing between columns of sensors, n is the number of the pixel in the array (e.g. n=(c−1) +r), and $F_x$ and $F_y$ are functions which provide x-axis and y-axis position offset values in a non-uniform manner.

According to the preferred embodiment, a CRC process is used to generate the pseudo-random display element position offset values, as this avoids the need for large look up tables and only requires three parameters to "seed" the determination of all the offset values. While the intermediate results of a CRC process produce a sequence of numbers which are pseudo-random in nature (e.g. non-uniform), CRC processes are entirely predictable in that when they are performed over the same set of data, they yield exactly the same set of intermediate values.

Therefore, a predictable and repeatable number generator can be implemented by seeding a CRC process with an initial CRC value, and then recirculating the data through the algorithm for n iterations, each iteration of the process generating an intermediate value which can be converted into an offset value for display element position n.

Then, to recreate the sequence of offset values for a given array, the process must only be provided the CRC XOR polynomial, the "seed" value, and the conversion method for extracting an offset value from the CRC value at each iteration.

Table 1 shows the pseudocode for such a CRC process, in which an initial CRC value is used to start the process. Then, in each iteration of the offset determination, the current value of the CRC is exclusive-OR'ed on a bitwise basis with a polynomial, and an offset value is extracted from the modified CRC.

This offset value for the $n^{th}$ iteration is the offset value for the $n^{th}$ display element, where $n=(c-1)+r$. The offset value is preferrably extracted from the CRC value by taking certain bits from the CRC value (e.g. $b_6$, $b_4$, $b_3$, and $b_1$ of an 8-bit CRC), and concatenating them to yield an offset value in binary format. Then, this offset value can be scaled to range within an acceptable physical offset deviation in either axis.

Next, the modified CRC value is barrel shifted left (e.g. shifted to the left whereby the most significant bit is moved to the least significant bit) until a "1" is obtained in the least significant bit of the CRC. This shifted version of the CRC becomes the CRC value to be XOR'ed in the next iteration for pixel n+1.

TABLE 1

Example CRC Pseudo Random Number Generator Process

```
CRC = seed_value
For pixel = 1 to N
    CRC = CRC XOR polynomial
    offset = concatenated tap bits of CRC
    F(pixel) = scaled offset
    barrel shift left CRC until least significant bit is a "1"
next_pixel
```

This type of process can be used to generate the x-axis offsets as well as the y-axis offsets. Preferably, different seed values are used for x-axis offsets and y-axis offsets to provide a more random and non-uniform distribution of the sensors.

For example, consider a two-dimensional array of TFT display elements such as a 284 by 480 pixel display having a pixel-to-pixel spacing in both x- and y-axes of 0.974 mm. Also, assume that the display elements are 0.400 square, and that they cannot be placed closer to each other than 0.174 mm to maintain manufacturability, routing of control signals, etc. This provides for a maximum deviation in the x-axis or the y-axis from a standard grid position of 0.974–0.300–0.174 =0.500 mm for a non-uniformly distributed array of display elements according to the present invention.

To realize a non-uniformly distributed two-dimensional array of similar resolution (e.g. same number of pixels where N=754*244=183,976) in this example, a pseudo-random non-uniform number function (PSNUF) is defined using an 8-bit wide CRC ($b_7b_6b_5b_4b_3b_2b_1b_0$ with $b_7$ being the most significant bit) seed value of b'11010010 (h'D2) for the x-axis offset, a seed value of b'10110111 (h'B7) for the y-axis offset, and an XOR polynomial of b'10011011 (h'9B), where b' denotes binary notation and h denote hexadecimal notation.

Further, the offset values in this practical example may be determined by "tapping" and concatenating $b_6b_4b_3b_1$ from the CRC value in the $n^{th}$ iteration for the sensor n to produce a 4-bit offset value ranging non-uniformly between and including 0 and 15 in decimal notation. In this example, we may use offset values 0 through 7 to represent left and down offsets from the standard grid, and values 8 through 15 to represent right and up offsets from the standard grid. Alternatively, another bit from the CRC could be tapped as a sign bit, with left/down offsets being negative and right/up being positive, etc.

Finally, the offset values are scaled to fit the maximum allowable offset range. In this example, if the display array fabrication process requires a minimum spacing of 0.174 mm, and the variance from uniform center spacing which is allowable is 0.500 mm, the scaling process of Table 2 can be employed to determine the physical offset of a particular sensor.

TABLE 2

Example Offset Scaling Process

```
If 0 ≦ offset ≦ 7 then
    direction = left or down
    offset_distance = (offset / 8) * P_offset_max
else
    direction = right or up
    offset_distance = [(offset - 7) / 8] * P_offset_max
endif
```

So, in this example, the first few x-axis offset values given the x-axis seed value, polynomial and tap bits, would be 10, 7, 9, 13, 9, 7, 15, etc., for the first, second, third, etc., sensors. After scaling, the physical x-axis offsets would be right 0.1875 mm left 0.4375 mm, right 0.125 mm, right 0.375 mm, etc., for the first, second, third, etc., sensors.

For the y-axis offset values, the first few offset values (using the y-axis seed value) would be 2, 15, 11, 1, 3, 11, 4, 7, etc., for the first, second, third, etc., sensors, which scales to down 0.125 mm, up 0.500 mm, up 0.250 mm, down 0.0625 mm, down 0.1875 mm, etc.

Employing such a distribution function, a new two-dimensional array is preferably fabricated with the non-uniformly spaced display elements according to the non-uniform functions $F_x$ and $F_y$, instead of the uniform spacing of prior art display arrays. This is preferably done in the display array design and layout, such as the phase of design of a TFT array. This allows for the manufactured array or panel to incorporate the display elements with the x-axis spacing of the function $F_x$ and y-axis spacing of the function $F_y$, such that when it is used for image display, moiré patterns will not form in the apparent image.

So, in a first aspect of the present invention, the physical design or "layout" of a digital display such as an LCD or TFT display is realized with the display elements non-uniformly arranged according to a well-defined function. Preferably, this design is then repeatable in manufacturing such that each "model" of display is known to have a certain non-uniform distribution function or functions with which it is arranged.

Figure 6:
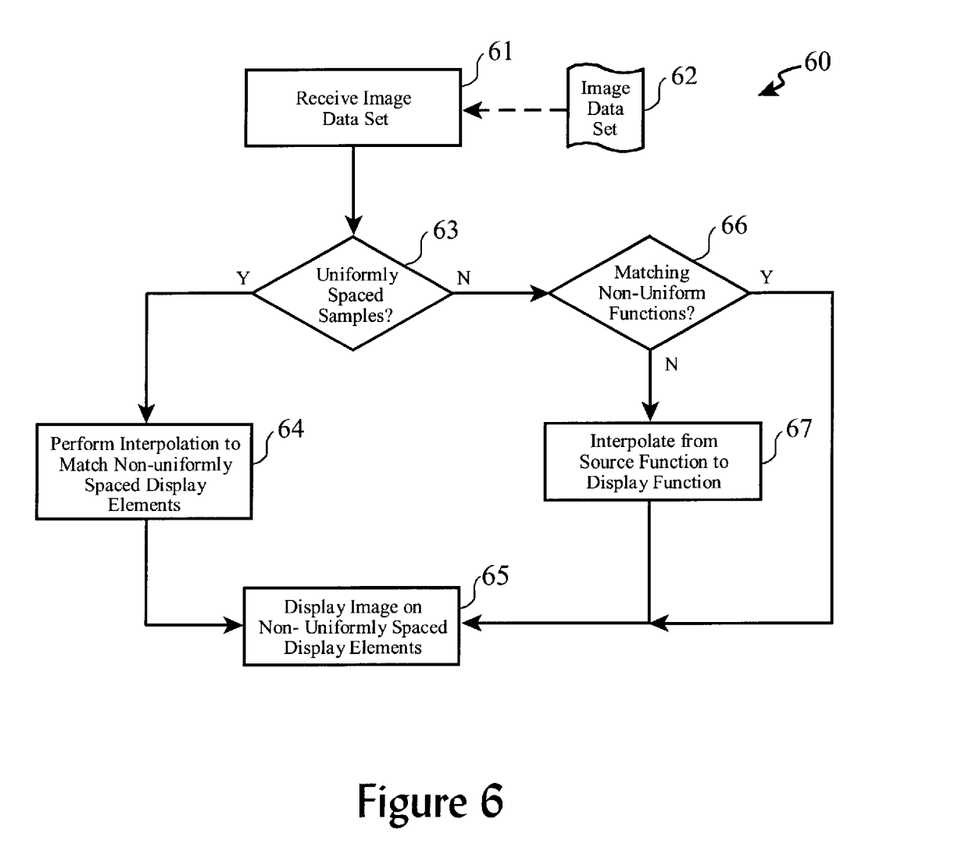
FIG. 6 sets forth the logical process of the invention to an observable image on a non-uniformly distributed display element array from standard data sets and data sets according to the related patent applications.

These distribution functions are, then, a known characteristic of the display, which can be used to generate appropriate brightness values for each pixel in the new display according to the logical process shown in FIG. 6.

An image set (62) to be displayed may be of two general types: a data set representing image samples taken in a uniformly spaced sensor array, or a data set representing image samples taken from a non-uniformly spaced sensor array (such as the image sensors of the related patent applications). In the case of the former data set type (63)

such as a bit map, JPEG or MPEG data file, interpolation (64) can be used to determine each pixel value in the non-uniformly spaced display array from the uniformly-spaced data sample.

Figure 7:
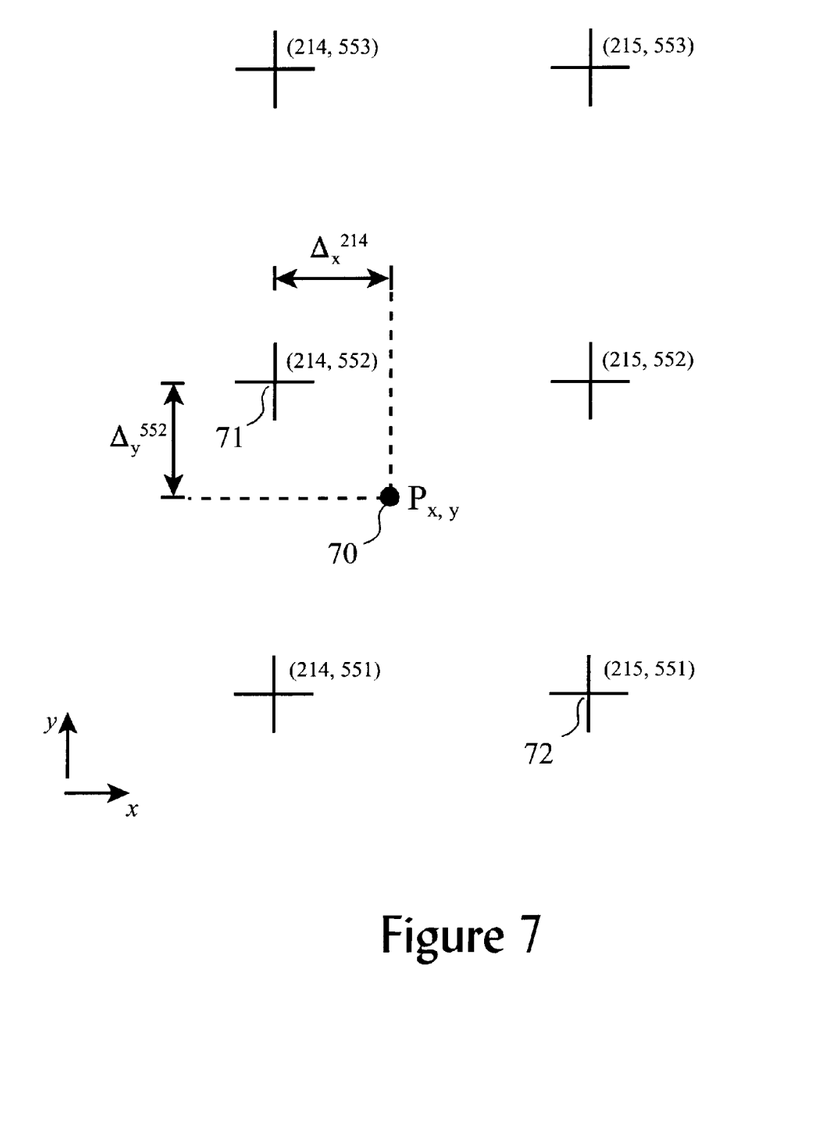
FIG. 7 provides a graphical illustration of the process of interpolation.

For example, a pixel at position x=214 and y=552 may be linearly interpolated by using the surrounding data values in the uniformly-spaced data set. If, for example, $F_x(214)$ is positive (display element is to the right of the standard grid point 71) and $F_y(552)$ is negative (display element is below the standard grid point 71), the data set pixel value at (214,552) and (214+1, 552−1) or (215, 551) may be used for the interpolation of the actual pixel value on the display, as shown in FIG. 7. In such a case, simple linear interpolation between the two values for pixels (214, 552) and (215, 551) could be performed to determine the pixel value in the non-uniformly spaced display array.

In a more advanced implementation, multiple direction interpolation, such as cubic spline interpolation, between multiple surrounding data values (214,552), (215,552), (214, 551) and (215,551) could be performed to generate an even more accurate value for the pixel in the non-uniformly spaced display array. If the nature of the data set (e.g. the nature of the originating sensor and signal types) indicate nonlinear response, then nonlinear estimation of the data value can be employed according to the application requirements. This, for example, may be indicated for other types of spectra, such as X-ray or magnetic resonance imaging applications.

One the value of each pixel has been determined, it may be applied (65) to the display elements themselves to reproduce the image, albeit by illuminating non-uniformly arranged display elements thereby avoiding the appearance of moiré patterns in the reproduced image.

Returning to the process of FIG. 6, if the data set (62) does not represent a set of image samples from a uniformly-spaced sensor array (e.g. the data set was produced using the methods and systems of the related patent applications), a check (66) to see if the non-uniform spacing functions of the sensor array and the display array match. It is possible that an industry standard non-uniform spacing function could be adopted such that imaging sensors (e.g. cameras, scanners, etc.) and display (LCDs, TFTs, etc.) could employ the same nonlinear spacing functions in their designs, such as a standard CRC polynomial function. In such a case, the data set may be displayed directly onto the non-uniformly arranged array of display elements (65) without further processing, interpolation or estimation. If the non-uniform functions of the sensor and the display do not match, then interpolation or estimation may be performed (67) as previously discussed using two or more adjacent data values to each display element.

Returning to our example of a line in an image to be displayed which is just off perfect horizontal or vertical alignment (e.g. 3°, 87°, etc.), one advantage of the invention is readily apparent in that this feature in the image would not regularly interfere with the pattern of the non-uniformly spaced display elements.

In a partially-digital display arrangement such as a CRT, only the digital axis need be handled according to the non-uniform function (e.g. the y-axis or vertical axis), and the x-axis may be displayed according to the current technology. This would have the effect on a CRT of changing the straight horizontal scan lines of the current displays to non-uniformly varied (e.g. "squiggly") horizontal scan paths. In the example of displaying a horizontal line in an image such as a sports field marker on a television, it is readily apparent that the display of the present invention would not have a noticeable interference pattern with the line in the image.

While certain details of a preferred embodiment have been disclosed, and certain examples have been given to illustrate the invention in a more understandable manner, it will be recognized by those skilled in the art that the spirit and scope of the present invention is not limited to these examples and embodiment details. For example, certain terms including x-axis, y-axis, left, right, above and below, have been adopted to provide a useful frame of reference. These terms, however, should not be interpreted in a limiting manner, as other terms such as horizontal/vertical, radial/angular, north/south/east/west, etc., can be used to describe the invention in other but equivalent frames of reference.

Further, the invention may be employed for a wide range of information gathering and imaging applications, not just photographic and visible spectrum imaging, such as magnetic resonance imaging, radar and sonar imaging, etc. Therefore, the scope of the present invention should be determined by the following claims.

What is claimed is:

1. A method of producing a two-dimensional array of display elements, said method comprising the steps of:
determining a plurality of display element positions, each position having a spacing in a first axis from a datum point according to a first non-uniform distribution schema, and each position having a spacing in a second axis from said datum point according to a second non-uniform distribution schema;
providing a two-dimensional array of display elements, each element being positioned on said army according to the determined positions in said first and second axes;
providing a means for operating said display elements such that a two-dimensional display element array having non-uniform sensor distribution is realized;
receiving a first set of data samples representing and image to be displayed on said array of display elements;
determining if interpolation is required to adapt said first data sample set to non-uniformly spaced display elements; and
performing interpolation to synthesize a second set of data samples representing non-uniformly spaced data samples from said first set of data samples in order to render said image to be displayed on said array of display elements.

2. The method as set forth in claim 1 wherein said step of receiving a first set of data samples comprises receiving a joint photographic experts group format image file.

3. The method as set forth in claim 1 wherein said step of receiving a first set of data samples comprises receiving a motion picture experts group format image file.

4. The method as set forth in claim 1 wherein said step of receiving a first set of data samples comprises receiving a bitmap format image file.

5. A computer readable medium encoded with software for creating a synthesized non-uniformly-spaced data set from a uniformly-spaced data set in an imaging system, said software when executed by a processor causing the processor to perform the steps of:
receiving a first set of data samples representing and image sampled at uniformly distributed sample points; and
performing interpolation to synthesize a second set of data samples representing non-uniformly spaced data samples from said first set of data samples in order to render said image capable of being displayed on an array of non-uniformly spaced display elements.

6. The computer readable medium as set forth in claim 5 wherein said software for receiving a first set of data samples comprises software for receiving a joint photographic experts group format image file.

7. The computer readable medium as set forth in claim 5 wherein said software for receiving a first set of data samples comprises software for receiving a motion picture experts group format image file.

8. The computer readable medium as set forth in claim 5 wherein said software for receiving a first set of data samples comprises software for receiving a bitmap format image file.

9. A display system comprising:

a display element array means, said array having a set of display elements arranged in first axis in a non-uniform manner according to a first schema and in a second axis in a non-uniform manner according to a second schema;

a display element control means operating said display elements; and a dithered data set interpretation means for driving said display element control means such that an image is apparent on said array; and a non-liner interpolation means for synthesizing a non-uniformly-spaced data sample set compatible with said non-uniform manners from a uniformly-spaced data set.

10. The display system as set forth in claim 9 wherein said interpolation means is adapted to convert joint photographic experts image data sets to non-uniformly spaced data sets.

11. The display system as set forth in claim 9, wherein said interpolation means is adapted to convert motion pictures experts image data sets to non-uniformly spaced data sets.

12. The display system as set forth in claim 9 wherein said interpolation means is adapted to convert bitmap image data sets to non-uniformly spaced data sets.

* * * * *